(12) United States Patent
Engström et al.

(10) Patent No.: US 8,387,449 B2
(45) Date of Patent: Mar. 5, 2013

(54) METHOD AND DEVICE FOR TESTING OF A COMBUSTION ENGINE OR AN ASSOCIATED STRUCTURE AND A RIG

(76) Inventors: Christian Engström, Tyresö (SE); Jonny Färnlund, Skärholmen (SE)

(*) Notice: Subject to any disclaimer, the term of this patent is extended or adjusted under 35 U.S.C. 154(b) by 0 days.

(21) Appl. No.: 12/595,361

(22) PCT Filed: Apr. 11, 2008

(86) PCT No.: PCT/SE2008/000265
§ 371 (c)(1),
(2), (4) Date: Nov. 9, 2009

(87) PCT Pub. No.: WO2008/127176
PCT Pub. Date: Oct. 23, 2008

(65) Prior Publication Data
US 2010/0107750 A1 May 6, 2010

(30) Foreign Application Priority Data
Apr. 13, 2007 (SE) .................... 0700913

(51) Int. Cl.
*G01M 15/00* (2006.01)
(52) U.S. Cl. ........... 73/116.05; 73/114.15; 73/116.06
(58) Field of Classification Search ......... 73/114.15, 73/116.05, 116.06
See application file for complete search history.

(56) References Cited

U.S. PATENT DOCUMENTS

| | | | |
|---|---|---|---|
| 4,370,883 A | 2/1983 | Coetsier et al. | |
| 4,669,318 A | 6/1987 | Angstrom | |
| 4,691,288 A | 9/1987 | Kay et al. | |
| 4,843,870 A | 7/1989 | Citron et al. | |
| 4,939,985 A * | 7/1990 | Von Thun | 73/116.01 |
| 5,036,700 A | 8/1991 | Knestel | |
| 5,132,909 A * | 7/1992 | Schroeder et al. | 701/101 |
| 5,323,644 A * | 6/1994 | Schaefer | 73/118.01 |
| 5,357,788 A | 10/1994 | Kantschar et al. | |
| 6,082,188 A | 7/2000 | Angermaier et al. | |
| 6,234,010 B1 | 5/2001 | Zavarehi et al. | |
| 6,573,678 B2 * | 6/2003 | Losey et al. | 318/470 |
| 6,754,615 B1 * | 6/2004 | Germann et al. | 703/8 |
| 6,866,024 B2 * | 3/2005 | Rizzoni et al. | 123/430 |
| 6,901,815 B2 * | 6/2005 | Torre | 73/862.29 |
| 7,104,118 B2 * | 9/2006 | Tentrup et al. | 73/116.06 |
| 7,117,730 B2 * | 10/2006 | Karrer et al. | 73/123 |
| 7,367,229 B2 * | 5/2008 | Engstrom | 73/168 |
| 7,530,263 B2 * | 5/2009 | Sowle | 73/118.01 |
| 8,001,835 B2 * | 8/2011 | Engstrom | 73/116.06 |
| 2002/0002877 A1 | 1/2002 | Torre | |
| 2003/0167118 A1 | 9/2003 | Rizzoni et al. | |

(Continued)

FOREIGN PATENT DOCUMENTS

| | | |
|---|---|---|
| EP | 0 469 658 A2 | 2/1992 |
| EP | 0 727 652 A2 | 8/1996 |

*Primary Examiner* — Freddie Kirkland, III
(74) *Attorney, Agent, or Firm* — Dickstein Shapiro LLP (57) ABSTRACT

A method and a device for performing tests on an internal combustion engine or a structure which is associated with the engine by measuring output parameter values on at least one output shaft ($3_{LF}$, $3_{RF}$) which is connected to the engine, is distinguished by producing a representation of variations in said output parameter values during operation of the engine, and evaluating the representation for determining an operating parameter value for the engine or the structure. The invention also concerns a dynamometer testing rig.

20 Claims, 6 Drawing Sheets

U.S. PATENT DOCUMENTS

| | | |
|---|---|---|
| 2004/0000191 A1 | 1/2004 | Ben-David |
| 2004/0007046 A1* | 1/2004 | Karrer et al. ................ 73/9 |
| 2006/0106526 A1 | 5/2006 | Sugita et al. |
| 2006/0130567 A1* | 6/2006 | Ben-David ............... 73/118.1 |
| 2008/0173101 A1* | 7/2008 | Sowle ..................... 73/862.09 |
| 2009/0126510 A1* | 5/2009 | Engstrom ............... 73/862.14 |

* cited by examiner

METHOD AND DEVICE FOR TESTING OF A COMBUSTION ENGINE OR AN ASSOCIATED STRUCTURE AND A RIG

FIELD OF THE INVENTION

This invention concerns a method and a device for testing of an internal combustion engine or an associated structure according to the respective preambles of the independent claims 1 and 14. It also concerns a rig including such a device.

BACKGROUND OF THE INVENTION

U.S. Pat. No. 4,669,318 concerns an apparatus for dynamometer testing of motor vehicles, wherein load absorbing means in the form of a hydrostatic pump assembly has an input shaft for engagement with a drive shaft of a vehicle to be tested. Sensor means are arranged so as to allow measuring the torque from the vehicle drive shaft.

Typically, in a vehicle having two-wheel drive, each drive shaft is connected to an individual apparatus of this kind, whereby a total effective torque from the vehicle can be accurately measured.

The apparatus according to the background art is reliable and accurately measures torque in a steady load situation.

Recently there have been demands for testing appliances that can provide more information about the engine or the associated structure to be tested.

AIM AND MOST IMPORTANT FEATURES OF THE INVENTION

It is an aim of this invention to provide a method and a device that overcome the drawbacks of the background art and provide an economic method and device for thoroughly testing different kinds of engines, associated structures and components in various situations.

These aims are obtained in respect of a method and a device as initially stated through the features of the characterizing portions of the independent claims 1 and 14. The invention makes it possible to thoroughly test an internal combustion engine and an associated structure in different aspects.

By producing a representation of variations in output parameter values, such as torque, rotational speed etc., during an engine cycle, and evaluating the representation for determining an operating parameter value for the engine or the structure, several advantages are obtained.

One important aspect of this is that the engine can be thoroughly analyzed with respect to possible irregularities so as to discover small peculiarities or even defects that could be corrected so as to improve the overall efficiency of the engine.

It also makes it possible to detect the result of even small changes in various equipment elements of the motor vehicle in the direction of for example more power, reduced fuel consumption with maintained power etc.

A conventional internal combustion engine transfers cylinder pressure into a rotational movement over a piston, a connecting rod and a crankshaft. The combustion energy is released during only a fraction of the period, typically 45 crank degrees. The result is a pressure increase in the cylinder, which in turn results in a corresponding increased torque at the crankshaft. The torque thus varies over the period which results in irregularities in the rotating motion. In order to reduce these irregularities, engines normally have flywheels.

A flywheel having greater moment of inertia gives a greater reduction of the irregularities. At the same time, there are drawbacks with heavy flywheels, such as e.g. weight and poor transient performance. For that reason, the irregularities remain, although more or less equalized, and are transferred to the output shaft. These irregularities or "variations" are identified and represented according to the invention.

The representation of the variations is accordingly preferably based on signals delivered continuously or with small steps from a sensor or sensors from the group: a speed sensor, (for example an incremental encoder), a torque sensor, a pressure sensor, a force sensor, an accelerometer.

Preferably also torque contribution from (an) individual cylinder or cylinders of the motor is identified and evaluated and for example related to a mean contribution value for active cylinders of the motor. This way, in particular, possible defects and possible potential improvements can be specifically linked to the individual cylinders of the engine including valve arrangements, port design in respect of their fuel and air feed, as well as exhaust arrangements. This is a great advantage since it provides an important tool for fine tuning of the vehicle components, testing of different designs, ports etc.

The said representation of variations in said output parameter values that during operation of the engine is produced during one engine cycle is advantageously performed for a plurality of, consecutive or non-consecutive, engine cycles. This has the advantage that a more reliable representation can be obtained, e.g. by taking mean values for a plurality of engine cycles. Also, this can be used to monitor real-time adjustments of the engine so as to immediately see the effect of the said adjustments.

It is preferred that the representation of variations is frequency analyzed and that a frequency value is created. In particular the frequency value is related to a speed signal for creating a total transmission ratio value for the vehicle (claim 11). This results in increased knowledge about the true transmission conditions of the vehicle and also about how the engine works in respect of the different transmission gears.

It is preferred that the representation is in real time for allowing feed-back from real time adjustments on the motor vehicle or vehicle component.

The method according to the invention is particularly advantageous when the torque is applied in a dynamometer testing rig of the kind mentioned above, since this gives great opportunities to fine-tune torque and to have accurate measurements.

The invention is, in a particularly preferred embodiment, particularly useful for performing the test on a motor vehicle or a component thereof by measuring the output parameter values on wheel shafts of said vehicle. Different motion parameters of the vehicle drive line vary because of different phenomenon. Thus, drive shaft rotational speed, drive shaft rotational acceleration, brake pump pressure in hydraulic pump and/or counter force can be monitored and evaluated.

When the frequency value is related to a speed signal for creating a total transmission ratio value for the vehicle can be calculated, which is a great advantage and simplifies evaluating of the impact of various parts and components of the vehicle on vehicle performance.

Another aspect of testing that this embodiment of the present invention also concerns is that it allows tests to be performed on one actual gear but, from the engines perspective, performed on another gear. This means that the acceleration and load on the engine is simulated so as to represent a gear which is different from the one actually selected to be operative at the instant. It also means that the simulated gear can be set to any ratio. This is a great advantage, since the vehicle and in particular the engine can be tested for e.g. acceleration capacity, performance with different gear ratios for the various gears without having to disassemble and reassemble the gearbox for every new intended gear combination.

It is preferred that the method is performed in a dynamometer testing rig having controllable hydraulic pumps for controlled braking so as to apply a braking torque to wheel shafts of a motor vehicle during the testing process.

Corresponding advantages to the above are achieved in respect of a device for performing tests that is provided with means for carrying out one or more of the above method steps.

BRIEF DESCRIPTION OF DRAWINGS

The invention will now be described in greater detail with reference to the drawings, wherein.

DESCRIPTION OF EMBODIMENTS

Figure 1:
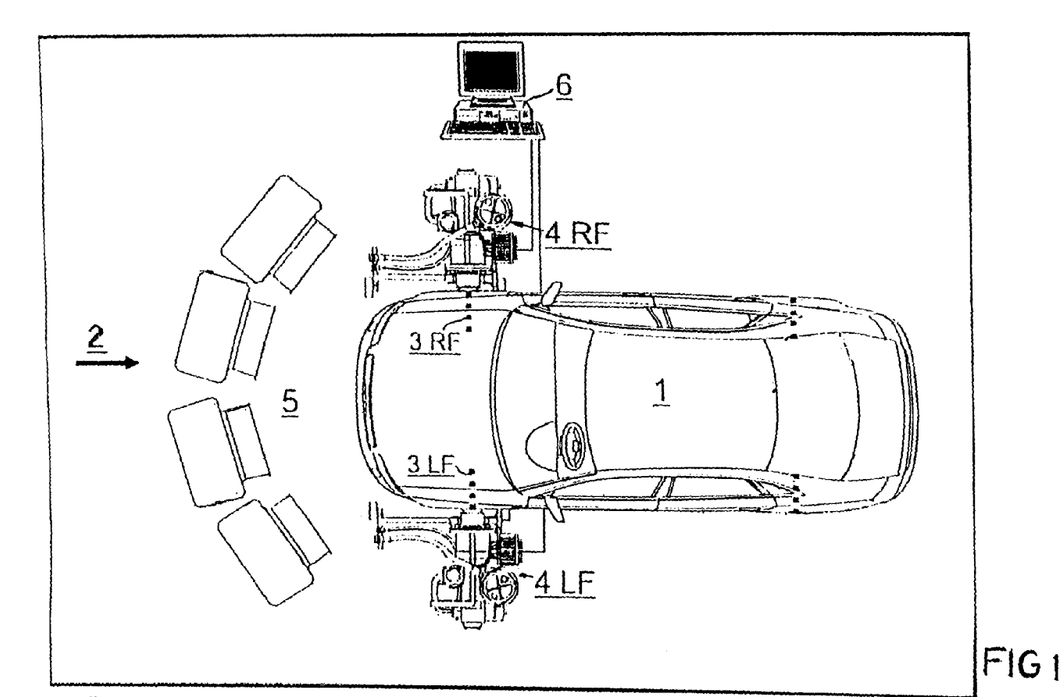
FIG. 1 shows an overview of a device according to the invention in the process of dynamometer testing a vehicle.

In FIG. 1, a vehicle 1 is in the process of being tested with a device according to the invention, generally indicated with 2.

Two dynamometer test units $4_{LF}$ and $4_{RF}$ are connected to the two front drive shafts of the vehicle 1 which is a two-wheel drive vehicle. The drive shafts are indicated with $3_{LF}$ and $3_{RF}$. LF=left front and RF=right front.

Each test unit $4_{LF}$ and $4_{RF}$ includes a torque sensor (according to the background art) in order to obtain torque values during operation of the system. A rotational speed sensor (not shown) is also provided for each drive shaft.

The basic features of the dynamometer test units are per se previously known and the units function such that a load absorbing means or brake in the form of a hydrostatic pump assembly has an input shaft for engagement with each drive shaft of the vehicle to be tested. Sensor means are arranged on a structure supporting the hydrostatic pump assembly so as to allow measuring the torque from the vehicle drive shaft. In particular, the deformation of an element included in the supporting structure, caused by the applied torque, is sensed. Hereby a total effective torque from the vehicle can be accurately measured.

A cooling unit 5 including a number of fans, serves to cool hydraulic fluid that has been heated because of throttling the flow during braking by applying torque over the individual test units $4_{LF}$ and $4_{RF}$. The cooling unit 5 can also be connected so as to produce a simulated air stream corresponding to the relative air movement when driving the vehicle on a road.

A control unit 6 serves for controlling action of the dynamometer test units and to provide acceleration torque models for simulating driving of the vehicle in different drive modes.

The invention makes it possible to simulate various conditions and driving situations in order to thoroughly test the vehicle, and for that matter of course also vehicle components, such as motors, motor parts and transmissions and transmission parts.

For example, different transmissions can be tested for evaluating performance under different conditions such as slippery roads, worn tires, load variations etc.

The great advantage with using a dynamometer testing rig in the method is that measuring is carried out at the drive shafts and not inside the engine. This means that a vehicle with no modifications or with only small modifications (such as addition of indexing means or rotation speed indices) can be tested.

Figure 2:
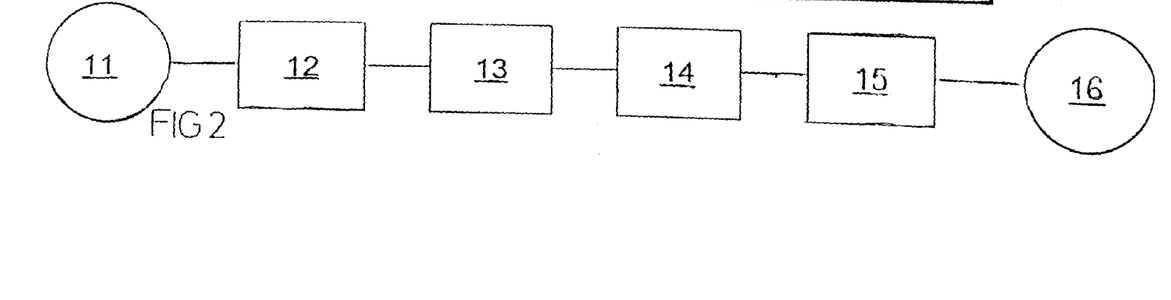
FIG. 2 shows a sequence over a method according to the invention.

An inventive method is briefly described referring to FIG. 2, wherein:

Position 11 indicates start of the session and start-up of a vehicle to be dynamometer tested.

Position 12 indicates speeding the engine to a pre-determined value, measuring torque and applying a counter-acting braking torque on each drive shaft in a manner known from the background art.

Position 13 indicates measuring rotational speed for each shaft.

Position 14 indicates producing a representation of variations in torque and/or rotational speed during an engine cycle.

Position 15 indicates evaluating the representation for determining an operating parameter value for the motor vehicle or the motor vehicle component. The operating parameter can be total transmission ratio, power contribution from individual cylinders, ignition position in individual cylinders etc.

Position 16 indicates end of sequence.

The invention makes it possible to accurately make measurements of the output parameter value such as torque or speed so that it is possible to detect the variations in these values during operation. The representations can then be displayed and/or printed out in such a manner that the variations are "magnified" and clearly detectable (as in FIGS. 3, 4, 6, 7).

The sequence can also be in real-time so that adjustments to the engine or other components of the vehicle can be immediately monitored on a computer screen or on a print-out.

The sequence can subsequently be repeated very fast under fast altered conditions so as to simulate dynamic situations.

Figure 3:
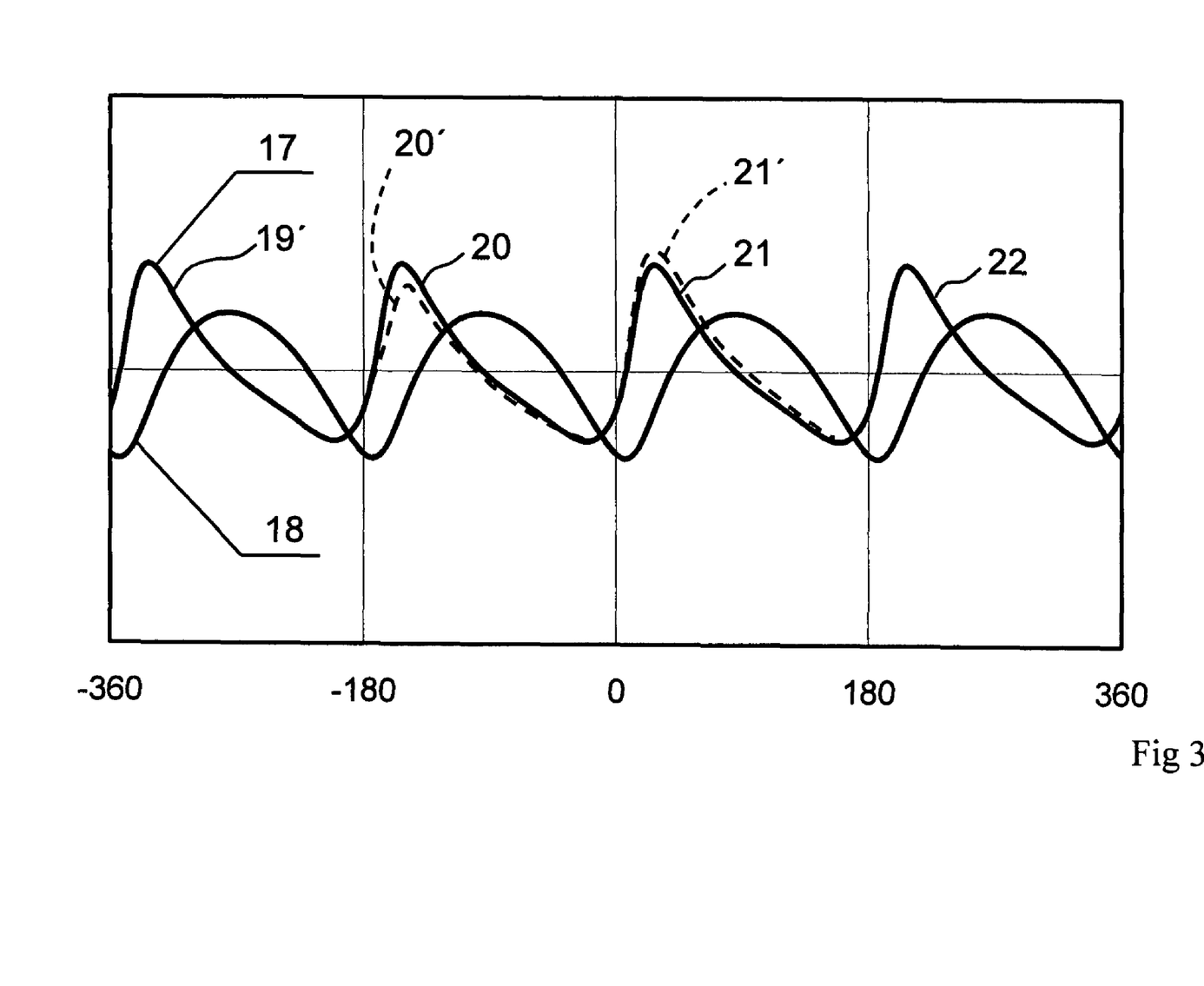
FIG. 3 shows a diagram over variations in torque and rotational speed in an engine cycle.

In FIG. 3, a curve representing variations in torque is indicated with 17 and a curve representing variations in rotational speed with 18 in an engine cycle of a four stroke, four cylinder, internal combustion engine. The curves are functions of crankshaft degrees.

The peaks 19-22 represent the torque contribution from the individual cylinders of the engine, and when displaying the representation 17 on a screen or a print-out, this gives great possibilities to analyze the engine in detail, as regards the individual cylinder torque contribution for different operating conditions such as at varying load, engine speed, fuel feed, inlet/exhaust pressures, ignition position etc. The person skilled in the art can relate the curve peaks to specific cylinders of an engine simply by for example adding a signal from an index point on an engine output shaft.

The representation gives the possibility to accurately analyze how different parameters influence i.a. torque output, in that torque contribution changes resulting from changes in the different operating parameters can easily be monitored. Hereby the vehicle as a whole and in particular the engine performance can be optimized accordingly.

As an example, 20' is a curve portion of torque contribution from one cylinder indicating that for that cylinder, with the operating parameters prevailing when the representation is made, the torque contribution is below a mean value for all the operating cylinders. With that information it is possible to make adjustments and controls for finding the reason for the poor output from that particular cylinder.

Also fixed construction elements can of course be scrutinized, such as inlet system, exhaust system, valve designs, cam shaft design etc. After having discovered the problem, it will be possible to make adequate adjustments and component replacements in order to increase contribution from that cylinder.

21' indicates a contribution which exceeds the mean value. This information is also of interest, since it indicates that there could be better output possibilities for also the other cylinders.

Based on the repetitive nature of the variations in torque and/or the variations in rotational speed, it is possible to obtain a frequency spectrum for each one of the output parameters. This can be done simply by frequency sampling any one of the representations shown in FIG. 3.

Figure 4:
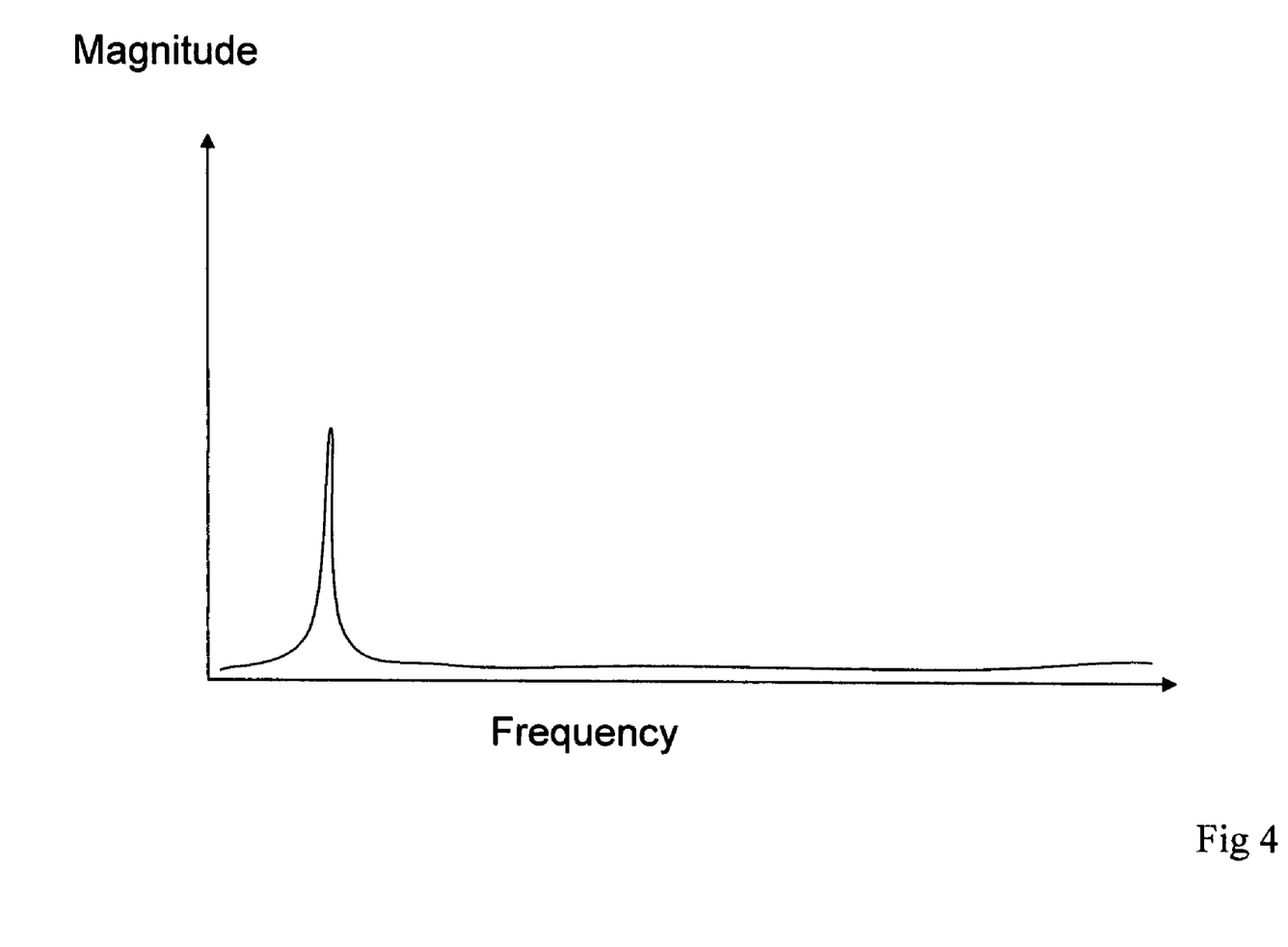
FIG. 4 shows a diagram over a frequency spectrum.

In FIG. 4, there is shown a frequency spectrum having a characteristic peak, which indicates the frequency, viz. the rotational speed of the engine. By correlating to a prevailing drive shaft rotation speed, among other things, the total true transmission ratio value for the vehicle can be easily and accurately determined for different gears etc. This value is otherwise difficult to retrieve in a precise way, and often has to be more or less estimated for the different gears of the vehicle.

It is also possible to use the frequency spectrum in the process of analyzing components in the driveline in order to fine tune the transmission. As an example, induced vibrations at specific speeds can be detected, by e.g. a broader peak, additional peaks etc., and after analyses be related to specific components. Also the operation of the engine can be analyzed, for example for determining ignition points in the various cylinders, how air and fuel mix in the cylinders etc.

Figure 5:
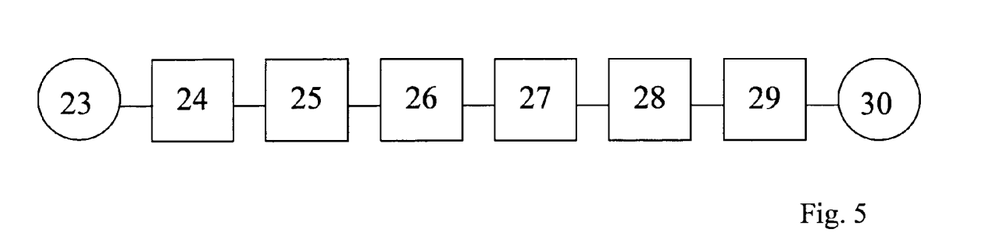
FIG. 5 shows a sequence over another method according to the invention.

Another inventive aspect is briefly described referring to FIG. 5, wherein:

Position 23 indicates start of the session and start-up of a vehicle to be dynamometer tested and set-up of the test program.

Position 24 indicates speeding the engine to a pre-determined value.

Position 25 indicates measuring rotational speed and, depending on the test program set-up, measuring torque and applying a counter-acting braking torque on each drive shaft in a manner known from the background art, corresponding to a simulated gear selection.

Position 26 indicates a moment of time where, according to the test program set-up (with or without triggering from internal/external source), a simulated gear change is made.

Position 27 indicates applying a measured torque on each drive shaft in a manner known from the background art, corresponding to the above simulated gear change.

Position 28 indicates producing a representation of variations in torque and/or rotational speed.

Position 29 indicates evaluating the representation for determining an operating parameter value for the motor vehicle or the motor vehicle component.

Position 30 indicates end of sequence.

The sequence is preferably in real-time so as to closely simulate real-world driving situations. The sequence can subsequently be repeated very fast under fast altered conditions so as to simulate dynamic situations.

Figure 6:
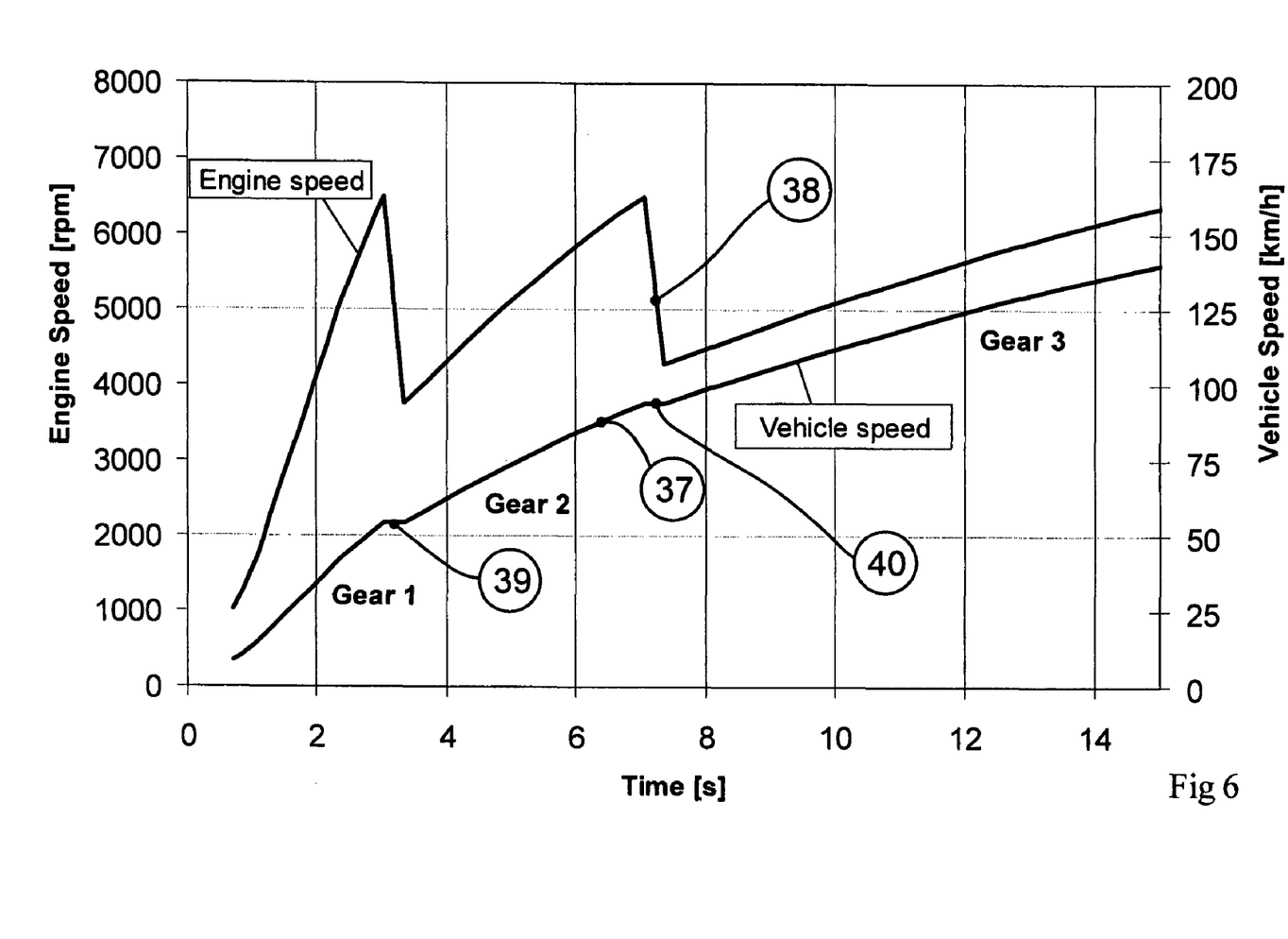
FIG. 6 shows a diagram over engine speed as a function of time in a simulated driving situation.

In FIG. 6, a curve representing the vehicle speed is indicated with 37 and a curve representing the engine speed with 38. Gear changes are shown at 39 and 40.

Figure 7:
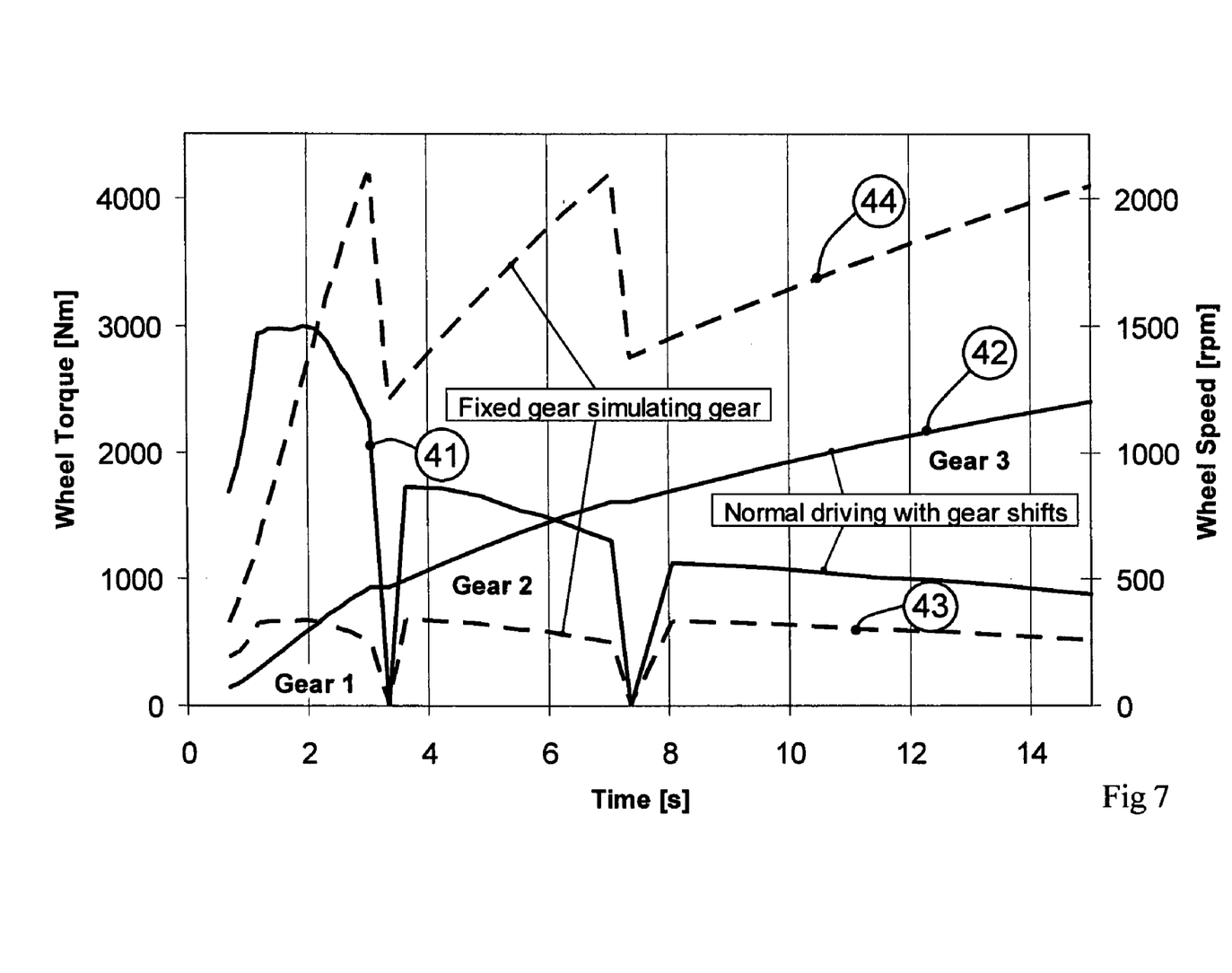
FIG. 7 shows a diagram over wheel torque as a function of time in a simulated driving situation.

In FIG. 7 the same sequence is shown, but in terms of drive shaft torque and rotational drive shaft speed. The drive shaft torque and the drive shaft speed "in real-world conditions" are indicated with 41 and 42 respectively.

From the engine's point of view, an equivalent representation is given with drive shaft torque as indicated with 43 and rotational drive shaft speed as indicated with 44. The inventive method thereby allows studies and optimization of engine behavior during alternating transmission rates without the shifting of gears.

Basically, the force of the engine acts against the driving resistance of the vehicle, viz. air and rolling resistance and resistance because of acceleration. The relation between these parameters is coupled to total transmission ratio and tire size. By e.g. setting another tire size, the condition will be as if there exists a different total transmission ratio:

Vehicle speed=(engine rotation speed/transmission ratio)×tire circumference

By changing the relation between the vehicle speed and engine rotation speed, the behavior of the engine can be simulated for a desired transmission ratio.

The invention can also be adapted for other systems besides dynamometer testing rigs, even if the latter type of systems are preferred, since they are proved to have the possibility of having the required response time and accuracy.

It is preferred that the invention is used in respect of engines in vehicles, but it is not excluded that it is used for testing stationary engines, engines in ships etc.

The invention claimed is:

1. Method for performing tests on an internal combustion engine or a structure which is associated with the engine by measuring output parameter values on at least one output shaft ($3_{LF}$, $3_{RF}$) which is connected to the engine, characterized by
    producing a representation of variations in said output parameter values during operation of the engine,
    said variations in said output parameter values during operation of the engine being variations during a single engine cycle,
    evaluating the representation for determining an operating parameter value for the engine or the structure, wherein the said test is performed by measuring the said output parameter values after a transmission, and
    the measuring of the output parameter values after the transmission being a measuring of the output parameter values on at least one wheel shaft (3LF, 3RF) of a vehicle.

2. Method according to claim 1, characterized in that the said test is performed on a motor vehicle (1) or a motor vehicle component.

3. Method according to claim 2, characterized in that an operating parameter value for the motor vehicle or the motor vehicle component is determined.

4. Method according to claim 1, characterized in that the said representation of variations in said output parameter values during operation of the engine are being produced for a plurality of, consecutive or non-consecutive, engine cycles.

5. Method according to claim 1, characterized in that torque contribution from an individual cylinder or cylinders of the engine is identified and evaluated and related to torque delivered by one or more other active cylinders of the engine.

6. Method according to claim 1, characterized in that the representation of variations is frequency analyzed and that a frequency value is created.

7. Method according to claim 6, characterized in that the frequency value is related to a speed signal for creating a total transmission ratio value for the vehicle.

8. Method according to claim 1, characterized in that the representation is related to an engine speed signal for creating a momentary torque contribution value for the engine.

9. Method according to claim 1, characterized in that the representation is in real time for allowing feed-back from real time adjustments on the engine or the structure.

10. Method according to claim 1, characterized in that torque is applied in a dynamometer testing rig.

11. Method according to claim 10, characterized in that the said dynamometer testing rig comprises a load absorbing means or brake in the form of a hydrostatic pump assembly with engagement means for engagement with one or more drive shafts of the vehicle.

12. Method according to claim 10, characterized in that the said measuring of output parameters is performed by the dynamometer testing rig.

13. Method according to claim 1, characterized in that the output parameter is one from the group: torque, rotational speed, acceleration.

14. Method according to claim 1, characterized in applying a counter-acting braking torque on each drive shaft corresponding to a simulated gear selection.

15. Method according to claim 14, characterized in that an operating cycle with at least one simulated gear shift is made.

16. Device for performing tests on an internal combustion engine or a structure which is associated with the engine including means for measuring output parameter values on at least one output shaft ($3_{LF}$, $3_{RF}$) which is connected to the engine, characterized by means for producing a representation of variations in said output parameter values during operation of the engine, the said representation of variations in said output parameter values during operation of the engine are being produced during one engine cycle, means for evaluating the representation for determining an operating parameter value for the engine or the structure, and means for measuring the said output parameter values after a transmission, and wherein the measuring of the output parameter values after a transmission is a measuring of the output parameter values on at least one drive shaft (3LF, 3RF) of the vehicle.

17. Device according to claim 16, characterized in that the said test is arranged to be performed on a motor vehicle (1) or a motor vehicle component.

18. Device according to claim 16, characterized in that the said representation of variations in said output parameter values during operation of the engine are being produced for a plurality of, consecutive or non-consecutive, engine cycles.

19. Device according to claim 16, characterized by means for identifying and evaluating torque contribution from an individual cylinder or cylinders of the engine and for relating it to torque delivered by other active cylinders of the engine.

20. Dynamometer testing rig for rigidly applying torque to drive shafts of a motor vehicle, characterized in that it includes a device according to claim 16.

* * * * *

UNITED STATES PATENT AND TRADEMARK OFFICE
CERTIFICATE OF CORRECTION

PATENT NO. : 8,387,449 B2  Page 1 of 1
APPLICATION NO. : 12/595361
DATED : March 5, 2013
INVENTOR(S) : Engström et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 33 days.

Signed and Sealed this
First Day of September, 2015

Michelle K. Lee
*Director of the United States Patent and Trademark Office*